(12) United States Patent
Rishea

(10) Patent No.: US 11,109,104 B2
(45) Date of Patent: Aug. 31, 2021

(54) VIEWER COMPOSITING FOR ENHANCED MEDIA RECOMMENDATION AND CONSUMPTION

(71) Applicant: DISH Network L.L.C., Englewood, CO (US)

(72) Inventor: John Rishea, Centennial, CO (US)

(73) Assignee: DISH Network L.L.C., Englewood, CO (US)

(*) Notice: Subject to any disclaimer, the term of this patent is extended or adjusted under 35 U.S.C. 154(b) by 0 days.

(21) Appl. No.: 16/507,942

(22) Filed: Jul. 10, 2019

(65) Prior Publication Data

US 2021/0014569 A1 Jan. 14, 2021

(51) Int. Cl.
| | |
|---|---|
| *H04N 21/466* | (2011.01) |
| *H04N 21/45* | (2011.01) |
| *H04N 21/472* | (2011.01) |
| *H04N 21/4147* | (2011.01) |
| *H04N 21/482* | (2011.01) |
| *H04N 21/422* | (2011.01) |

(52) U.S. Cl.
CPC ..... *H04N 21/4668* (2013.01); *H04N 21/4147* (2013.01); *H04N 21/42204* (2013.01); *H04N 21/4532* (2013.01); *H04N 21/47217* (2013.01); *H04N 21/4821* (2013.01); *H04N 21/4222* (2013.01); *H04N 21/42206* (2013.01)

(58) Field of Classification Search
None
See application file for complete search history.

(56) References Cited

U.S. PATENT DOCUMENTS

| | | | | |
|---|---|---|---|---|
| 5,915,238 A * | 6/1999 | Tjaden | ................. | G10H 1/0033 704/251 |
| 6,112,186 A * | 8/2000 | Bergh | .................... | G06Q 30/02 705/7.32 |
| 6,530,083 B1 * | 3/2003 | Liebenow | .............. | H04N 7/163 348/E7.061 |
| 2002/0194586 A1 * | 12/2002 | Gutta | ................. | H04N 21/4223 725/10 |
| 2004/0003392 A1 * | 1/2004 | Trajkovic | ........... | H04N 21/4661 725/10 |
| 2009/0222392 A1 * | 9/2009 | Martin | .................. | G06F 16/437 706/46 |

(Continued)

*Primary Examiner* — Fernando Alcon
(74) *Attorney, Agent, or Firm* — Kilpatrick Townsend & Stockton LLP

(57) ABSTRACT

Novel techniques are described for viewer compositing using media playback systems for enhanced media recommendation and consumption. For example, a display device can be in communication with a media recommendation and consumption compositor (MRCC) system. When a group of viewers desires a shared media consumption experience, the MRCC system can detect the group of viewers and can obtain respective viewer profiles, which can be used to generate a composite profile representing a composite of the group of viewers. The MRCC system can determine an available content space indicating the content available for consumption and can compute a content recommendation space as a function of the composite viewer profile and the available content space that defines recommended content options for the composited group of viewers. A recommendation interface can be output to indicate recommended content options for selecting and viewing.

21 Claims, 6 Drawing Sheets

(56) References Cited

U.S. PATENT DOCUMENTS

| | | | |
|---|---|---|---|
| 2009/0271826 A1* | 10/2009 | Lee | H04N 21/4532 725/46 |
| 2009/0328105 A1* | 12/2009 | Craner | H04N 21/4667 725/46 |
| 2012/0278330 A1* | 11/2012 | Campbell | G06F 16/48 707/740 |
| 2014/0040932 A1* | 2/2014 | Gates, III | H04N 21/44213 725/14 |
| 2015/0019469 A1* | 1/2015 | Ioannidis | G06N 7/00 706/46 |
| 2016/0029057 A1* | 1/2016 | Wickenkamp | H04N 21/252 725/14 |
| 2016/0127788 A1* | 5/2016 | Roberts | H04N 21/4316 725/37 |
| 2016/0253710 A1* | 9/2016 | Publicover | H04N 21/2668 705/14.66 |
| 2018/0041805 A1* | 2/2018 | Gibbon | H04N 21/25841 |

* cited by examiner

VIEWER COMPOSITING FOR ENHANCED MEDIA RECOMMENDATION AND CONSUMPTION

FIELD

This invention relates generally to media playback systems, and, more particularly, to viewer compositing for enhanced media recommendation and consumption using media playback systems.

BACKGROUND

Television users have become accustomed to having access to hundreds of channels, advanced program guides, on-demand programming, digital video recording and storage, and other features that provide a very large number of available programming content options. With so many options, it can be difficult for users to keep track of which options are available to them at any particular time. Some conventional systems provide users with electronic programming guides and/or other listings of available content. While such listings can inform users about content availability, schedules, etc., they can have a number of limitations. For example, such listings can be overwhelming and/or incomplete when a large number of options are available, and such listings tend not to assist users with determining whether particular options are likely to be enjoyable, appropriate, and/or otherwise desirable for their consumption.

In an attempt to help users identify desirable content from large numbers of options, growing numbers of systems include recommendations. For example, when a particular user is searching for programming from a particular provider, the provider may provide an interface that presents the user with options similar to other programming the user has previously consumed and/or enjoyed, or with other programming that is popular among others deemed to be similar to the user. However, conventional recommendation approaches tend to function by analyzing a single user profile and generating a selection of recommended events for the user attached to that profile. When that user consumes programming in a group setting (e.g., a family or friends movie night), the recommendations generated may be inappropriate in that group context.

BRIEF SUMMARY

Among other things, embodiments provide novel systems and methods for viewer compositing using media playback systems for enhanced media recommendation and consumption. For example, a television or other display device can be in communication with a media recommendation and consumption compositor (MRCC) system. When a group of individual viewers sits in front of the television to jointly consume television programming or other media, embodiments of the MRCC system can detect the group of individual viewers as within a predefined viewing region of the display device and can obtain respective profiles of those individual viewers, which can be used to generate a composite profile representing a composite of the group of viewers. The MRCC system can determine an available content space indicating the full space of content available for consumption (e.g., all the television programming available over broadcast channels, from digital video recorders, etc.), and can compute a content recommendation space as a function of the composite viewer profile and the available content space that defines recommended content options for the composited group of viewers. A user interface can be output to the display device to indicate at least some of the recommended content options, and those options can be selected and viewed.

Additionally or alternatively, the composite profile can be used to dynamically affect content playback. For example, while the group of individual viewers is consuming media, viewers of the group can leave and/or viewers not of the group can enter. Some embodiments can detect when such changes in presence of individual viewers results in certain types of changes to the composite viewer profile and whether those changes trigger a predetermined condition. Such embodiments can take various types of remedial responsive action. For example, suppose a group of adults is watching a movie with explicit content, and a young child enters. In such a case, embodiments can quickly pause the movie, blank the screen, mute the volume, and/or otherwise adapt the content playback in a remedial responsive fashion.

According to one set of embodiments, a media receiver is provided. The media receiver is in communication with a display device and includes: a provider network interface to communicatively couple with one or more content provider networks; one or more processors; and a memory communicatively coupled with, and readable by, the one or more processors and having stored therein processor-readable instructions. When the instructions are executed by the one or more processors, they cause the one or more processors to: detect a plurality of individual viewers as within a predefined viewing region of the display device; obtain a respective individual viewer profile corresponding to each of the plurality of individual viewers; dynamically generate a composite viewer profile for the plurality of individual viewers as a composite of the respective individual viewer profiles; obtain an available content space indicating a plurality of programming content options available for output to the display device at least via the provider network interface; compute a content recommendation space as a function of the composite viewer profile and the available content space, such that the content recommendation space defines a plurality of recommended content options as a subset of the plurality of programming content options determined to be recommended in accordance with the composite viewer profile; and direct output, by the display device, of a user interface indicating at least a portion of the plurality of recommended content options.

According to another set of embodiments, a method is provided for viewer compositing in a media recommendation and consumption compositor (MRCC) system. The method includes: detecting, using the MRCC system, a plurality of individual viewers as within a predefined viewing region of a display device in communication with the MRCC system; obtaining, using the MRCC system, a respective individual viewer profile corresponding to each of the plurality of individual viewers; generating, using the MRCC system, a composite viewer profile for the plurality of individual viewers as a composite of the respective individual viewer profiles; obtaining, using the MRCC system, an available content space indicating a plurality of programming content options available for output to the display device; computing, using the MRCC system, a content recommendation space as a function of the composite viewer profile and the available content space, such that the content recommendation space defines a plurality of recommended content options as a subset of the plurality of programming content options determined to be recommended in accordance with the composite viewer profile;

and directing output, by the display device, using the MRCC system, of a user interface indicating at least a portion of the plurality of recommended content options.

According to another set of embodiments, a media recommendation and consumption (MRCC) system is provided. The MRCC system includes a viewer profiler, a content engine, a recommendation engine, and a display interface engine. The viewer profiler is to: detect a plurality of individual viewers as within a predefined viewing region of a display device; obtain a respective individual viewer profile corresponding to each of the plurality of individual viewers; and dynamically generate a composite viewer profile for the plurality of individual viewers as a composite of the respective individual viewer profiles. The content engine is to obtain an available content space indicating a plurality of programming content options available for output to the display device. The recommendation engine is communicatively coupled with the viewer profiler and the content engine, and is to compute a content recommendation space as a function of the composite viewer profile and the available content space, such that the content recommendation space defines a plurality of recommended content options as a subset of the plurality of programming content options determined to be recommended in accordance with the composite viewer profile. The display interface engine is to direct output, by the display device, of a user interface indicating at least a portion of the plurality of recommended content options.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
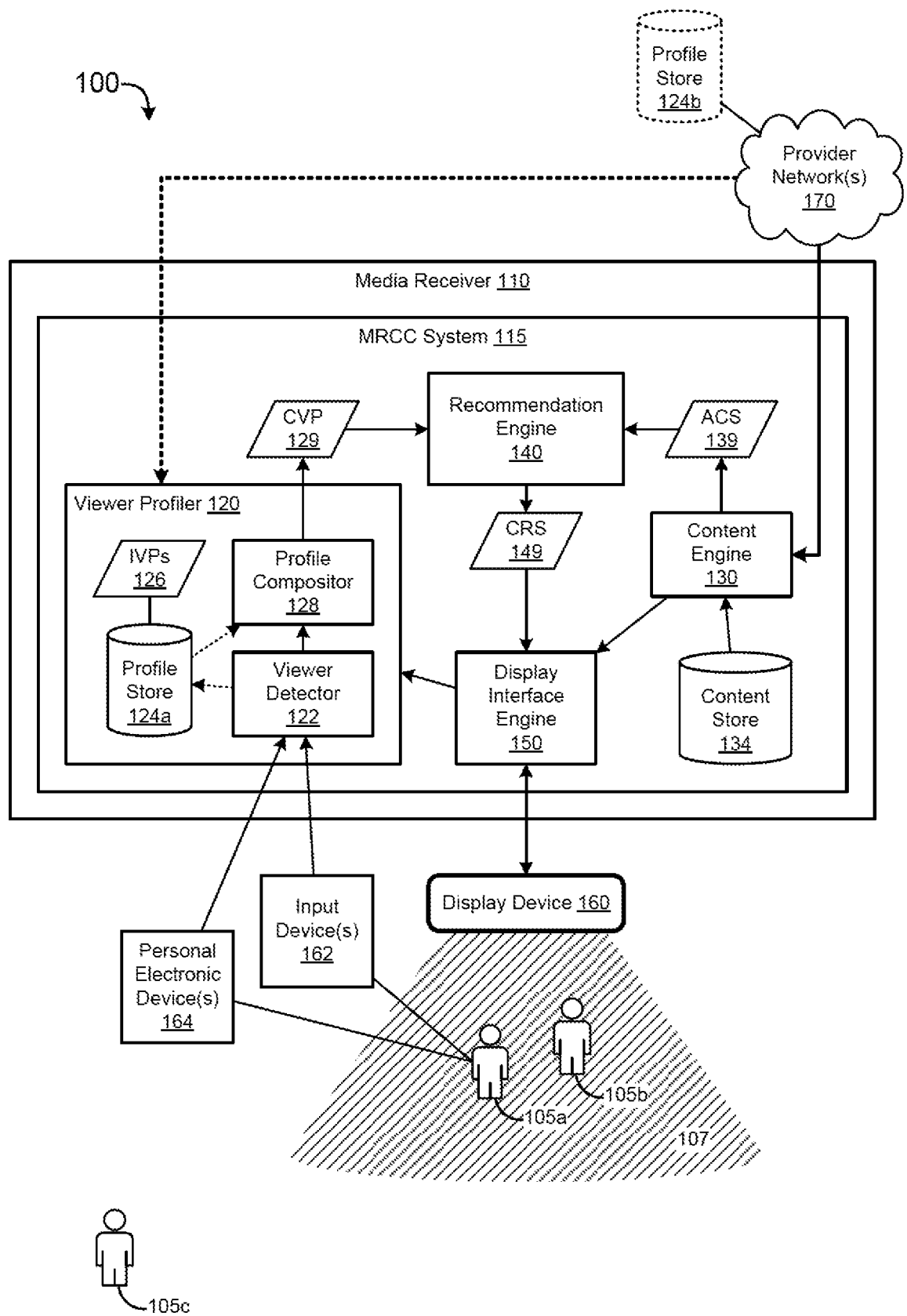
FIG. 1 shows an illustrative media consumption environment as a context for various embodiments described herein.

FIG. 1 shows an illustrative media consumption environment 100 as a context for various embodiments described herein. Embodiments described herein are assumed to operate in context of multiple individual viewers 105 seeking to share a media consumption experience via a display device 160. For example, the individual viewers 105 desire to watch a movie, television program, sporting event, or other media programming at the same time, in the same place, on the same television. Some contexts described herein assume that the individual viewers 105 desire content recommendations for a planned shared media consumption experience. In such contexts, embodiments can generate a composite profile of the group of individual viewers 105, determine which content is potentially available for consumption by the group of individual viewers 105, and can compute a content recommendation space as a function of the composite viewer profile and the available content to define recommended content options for the composited group of viewers. A user interface can be output to the display device to indicate at least some of the recommended content options, and those options can be selected and viewed. Other contexts described herein assume that the group of individual viewers 105 are presently sharing a media consumption experience, but the composition of the group changes over time (e.g., viewers previously determine to be in the group leave, and/or viewers not previously determined to be in the group enter). In such contexts, embodiments can detect when such group changes cause changes to the composite viewer profile that trigger a predetermined condition. In response to such a condition, various types of remedial responsive action can be takes, as described herein.

As illustrated, the media consumption environment 100 includes a number of individual viewers 105 (e.g., individual humans) situated with respect to a display device 160. The display device 160 is suitable for shared simultaneous use by multiple individual viewers 105 who are located within some predefined viewing region 107 of the display device 160. In one embodiment, the display device 160 is a television, and there is a predefined viewing region 107 from within which an individual viewer 105 would practically be capable of watching television programming displayed on the television. As illustrated, at any given time, one or more individual viewers 105 (e.g., individual viewer 105a and individual viewer 105b) may be within the predefined viewing region 107, such as in the same room of a house with the display device 160; while one or more other individual viewers 105 (e.g., individual viewer 105c) may be outside the predefined viewing region 107, such as in a different room from the display device 160.

The display device 160 is in communication with a media recommendation and consumption compositor (MRCC) system 115. In the illustrated embodiment of FIG. 1, the MRCC system 115 is disposed in (e.g., integrated within) a media receiver 110. For example, the display device 160 is in communication with a set-top box that can receive programming content (e.g., television programs, movies, digital media streams, etc.) from one or more media provider networks 170 (e.g., content networks, broadcast television networks, etc.), and the MRCC system 115 is implemented as components of the set-top box. In other embodiments, some or all components of the MRCC system 115 are implemented as part of a separate appliance, such as a dedicated appliance having its own housing, ports, etc. Some such embodiments can be in communication with a media receiver 110 (e.g., a set-top box). For example, the separate appliance may be configured to receive programming content directly from one or more provider networks 170, and/or the separate appliance may be configured to receive programming content via a connected media receiver 110. In other embodiments, the MRCC system 115 is integrated within the display device 160. For example, components of the display device 160 are used to implement components of the MRCC system 115. In some such embodiments, the display device 160 may be in communication with a media receiver 110 to receive programming content. Illustrated components can be in communication with each other (e.g., coupled with one another) in any suitable manner, including using any number and type of wired and/or wireless connections, physical and/or logical ports, intermediary public and/or private networks, etc.

Embodiments of the MRCC system 115 include a viewer profiler 120, a content engine 130, a recommendation engine 140, and a display interface engine 150. Though the MRCC system 115 is illustrated as including a particular set of components, the MRCC system 115 can alternatively be implemented with more or fewer components, with functionality assigned to different components, with some or all components distributed across multiple devices, and/or with some or all components being shared by other devices. For example, though the MRCC system 115 is illustrated as including a content store 134 (described below), the content store 134 may be a digital video recorder implemented by data storage components of the media receiver 110, of the display device 160, and/or of a separate appliance (e.g., an external data storage device).

Embodiments of the viewer profiler 120 can detect individual viewers 105 as being within the predefined viewing region 107 of the display device 160, can obtain a respective individual viewer profile 126 corresponding to each of the individual viewers 105, and can dynamically generate a composite viewer profile 129 for the individual viewers 105 as a composite of the respective individual viewer profiles 126. In some embodiments, the viewer profiler 120 includes a viewer detector 122 that performs viewer detection and obtain the respective individual viewer profiles 126 for the detected individual viewers 105. Embodiments of the viewer detector 122 can detect individual viewers 105 and obtain individual viewer profiles 126 in various ways. In some embodiments, the MRCC system 115 is configured to receive data via signals from one or more input devices 162, and those signals are usable by the viewer detector 122 to detect individual viewers 105 that are within the predefined viewing region 107 of the display device 160. For example, the input device(s) 162 include a remote control associated with the display device 160, and signals from the remote control are received by the display device 160 and passed (e.g., directly, and/or through a media receiver 110 or other component) to the viewer profiler 120. The remote control (or other suitable input device(s) 162) can be used to manually provide information indicating which individual viewers 105 are present. Manually providing information can involve prompting users to engage with any suitable type of user interface, such as with alphanumeric input (e.g., via a physical or virtual keyboard), audio input (e.g., via a microphone), gesture input (e.g., recorded by a camera or other sensor), biometric input (e.g., via a fingerprint or other biometric scanner), etc.

As an example implementation, the input device 162 includes voice input, and a user (e.g., one of the individual viewers 105) can verbally identify members of the group of individual viewers 105. The identification can include any suitable information. In some cases, the identification can include names of some or all of the present individual viewers 105. For example, a visual and/or audible prompt can be provided, stating: "Please identify who is watching TV right now," to which an individual can respond by saying: "Joe, Sally, and Mary Smith"; "All members of the Smith family"; or the like. Such cases can be implemented where the identified individuals are associable in the viewer profiler 120 with previously stored individual viewer profiles 126. For example, as illustrated, the viewer profiler 120 can include a profile store 124, which can be implemented as any suitable storage device or devices local to the MRCC system 115 (e.g., solid state storage of the MRCC system 115 and/or of the media receiver 110) and/or remote from the MRCC system 115 (e.g., in cloud-based storage or other server storage accessible via the one or more provider networks 170). The individual viewer profiles 126 can be stored in any suitable manner and can include any suitable information. For each of multiple individuals, the individual viewer profiles 126 can include a respective unique identifier (e.g., anonymized or not) for the individual stored in association with information relevant to content recommendation and/or to remedial content playback actions. For example, the individual viewer profile 126 for a particular individual may include content previously consumed by the individual, ratings of specific content received from the individual, etc.; categorical preferences of the individual, such as preferred genres, content types, etc.; demographic information for the individual, such as age, gender, etc.; subscription information for the individual, such as television channels, content services, and or other subscription packages to which the individual is a subscriber; blocks associated with the individual, such as parental blocks associated with the individual; and/or other suitable information. In response to the manual identification of individual viewers 105 (e.g., by spoken or other manual input into the remote control or other input device 162), the viewer detector 122 can parse one or more candidate viewers identities from the input (e.g., "All members of the Smith family" can be parsed into "Joe Smith," "Sally Smith," and "Mary Smith"), and the viewer detector 122 can consult the profile store 124 to look for a stored individual viewer profile 126 matching each of the parsed viewer identities. The viewer detector 122 can then use matching individual viewer profiles 126 for compositing, as described herein.

In another implementation, the identification can include categorical characterizations of some or all of the present individual viewers 105. For example, in response to a prompt, an individual may respond by saying: "One thirty-five year-old male, one six-year-old girl, and one twelve year-old boy"; "A group of children between eight and eleven years old"; or the like. In another implementation, characterizing information can be provided for some or all of the present individual viewers 105, such as where those individuals are not associated with a profile. For example, a prompt or series of prompts can be provided to guide creation of a profile for a particular individual viewer 105, and an option can be provided to store the profile for future access (e.g., in the profile store 124).

Some embodiments of the viewer detector 122 can detect some or all individual viewers 105 automatically using sensors that can communicate with one or more types of personal electronic devices 164. Personal electronic devices 164 can include types of devices that are generally associable with a particular user and are likely to be in proximity to the user when the user is in proximity to the display device 160, such as smart phones, smart watches, activity bracelets, etc. Communications between the viewer detector 122 and the personal electronic devices 164 can be over any suitable communication links, protocols, etc.; such as using one or more Bluetooth links, Zigbee links, WiFi links, narrow-band Internet of Things (nb-IoT) links, etc. In some implementations, signals received by the viewer detector 122 from the personal electronic devices 164 include an identifier of an associated individual viewer 105 (e.g., the name or pseudonym of the individual wearing the smart watch), and/or an identifier of the personal electronic device 164 (e.g., a media access control (MAC) address, network identifier, etc.) that is associable by the viewer detector 122 with a particular individual viewer 105. In such implementations, embodiments of the viewer detector 122 can look up a corresponding individual viewer profile 126 for each detected individual viewer 105.

In other implementations involving personal electronic devices 164, signals received by the viewer detector 122 from a personal electronic device 164 can include a full or partial individual viewer profile 126 for one or more individuals associated with the personal electronic device 164. For example, the viewer detector 122 receives an individual viewer profile 126 directly from the personal electronic device 164 and can store the individual viewer profile 126 (permanently or temporarily) in the profile store 124 (e.g., local to, and/or remote from, the MRCC system 115). In some embodiments, the input device 162 (e.g., remote control) can be treated by the viewer detector 122 as a personal electronic device 164 by associating the input device 162 with one or more individual viewers 105. For example, whenever a particular remote control is used to interact with the MRCC system 115 (and/or with the display device 160), the viewer detector 122 can automatically associate that interaction with the one or more individual viewers 105 associated with the remote control. Some embodiments of the viewer detector 122 permit users to configure parameters relevant to viewer detection. In one such embodiment, the viewer detector 122 includes an interface (e.g., displayed via the MRCC system 115 and/or the display device 160) to facilitate setting parameters of the predefined viewing region 107 (e.g., detection sensitivity), setting of permitted types of personal electronic devices 164, etc.

In some embodiments, having detected a group of individual viewers 105 (e.g., automatically and/or by manual input), the viewer detector 122 can direct prompting of for confirmation and/or modification of the detected group. For example, the viewer detector 122 can direct the display interface engine 150 to output a user interface to the display device 160 via which a user can view a representation of the detected group (e.g., as a list of names, a set of avatars or photos, etc.), and can interact to modify and/or confirm the detected group. In some implementations, the interface permits a user manually to add names of individual viewers 105, to establish communications (e.g., pair) with personal electronic devices 164, etc. In other implementations, the group of individual viewers 105 represented by the interface includes the detected group along with assumed or default group members, and the interface permits a user to select or deselect those assumed or default group members. For example, the interface can be generated to list all members of the household by default (e.g., selected by default, or de-selected by default).

Embodiments of the viewer profiler 120 can include a profile compositor 128. Having detected individual viewers 105 as being within the predefined viewing region 107 of the display device 160, and having obtained respective individual viewer profiles 126 corresponding to each of the individual viewers 105, embodiments of the profile compositor 128 can dynamically generate a composite viewer profile 129 for the individual viewers 105 as a composite of the respective individual viewer profiles 126. Profile compositing can be implemented in various ways. Some implementations generate the composite viewer profile 129 by computing a logical union of the individual viewer profiles 126. For example, where each individual viewer profile 126 includes a set of viewer restrictions, the union can represent the complete set of restrictions across all the viewers. Some implementations generate the composite viewer profile 129 by computing a logical intersection of the individual viewer profiles 126. For example, where each individual viewer profile 126 indicates a set of viewer preferences, the intersection can represent a set of shared viewer preferences across the group. Some embodiments first characterize (e.g., reduce) each individual viewer profile 126 in accordance with one or more paradigm profiles, then performs profile compositing on the paradigm profiles. For example, a group of five individual viewers 105 with detailed associated individual viewer profiles 126 can be reduced to a characterization as "adult male; adult female; teenaged girl; young boy; young boy." The reduced set can then be composited, for example, as "a group of mixed age and gender; tend to prefer comedy movies with child protagonist; restrict to rated G and PG." Some embodiments can use previous compositing to impact present compositing. For example, in the past, the profile compositor 128 has recorded (e.g., in the profile store 124) that a group of John, Mary, and Sally (e.g., or that previous mixed-age groupings, or any other suitable groupings of specific individuals, characteristics, etc.) has tended to like certain types of movies. If a present grouping is the same as, is similar to, includes, or otherwise relates to a previously recorded composite viewer profile 129, data associated with that previously recorded composite viewer profile 129 can be included in the present compositing (e.g., used in place of some or all members of the current group, used as an additional member of the group, etc.). Embodiments of the profile compositor 128 can use any additional techniques, such as weighting, filtering, etc. as part of profile compositing.

As noted above, embodiments of the MRCC system 115 include a content engine 130 to obtain an available content space 139 indicating programming content options available for output to the display device 160. Some embodiments of the content engine 130 are in communication with the one or more media provider networks 170 to receive programming content options. For example, the media provider networks 170 can include broadcast content networks, cable content networks, satellite content networks, internet protocol (IP) content networks (e.g., including IP television networks), over-the-top (OTT) content networks, and/or any other suitable public and/or private content networks. Some or all of the programming content options available via those media provider networks 170 can be included in the available content space 139. For example, subscription-only content may only be available to subscribers. Some embodiments of the content engine 130 are in communication with one or more content stores 134. The content store(s) 134 can include any local and/or remote storage devices operable to store programming content options as part of the available content space 139. For example, the content store 134 can be storage of a digital video recorder (DVR), a local server, etc. The available content space 139 can effectively be the set of all programming content options that are candidates for viewing by the group of individual viewers 105.

Embodiments of the MRCC system 115 include a recommendation engine 140 to dynamically generate recommendations of programming content options for the group of individual viewers 105. The recommendation engine 140 can be communicatively coupled with the viewer profiler 120 and the content engine 130 to compute a content recommendation space 149 as a function of the composite viewer profile 129 and the available content space 139. The computed content recommendation space 149 can define recommended content options as those of the programming content options determined to be recommended in accordance with the composite viewer profile 129. Embodiments of the recommendation engine 140 can compute the content recommendation space 149 in any suitable manner. Some embodiments use the composite viewer profile 129 to generate a set of filter criteria, and apply the set of filter criteria to metadata of the programming content options in the available content space 139 to generate a filtered subset of programming content options as the content recommendation space 149. Some embodiments place the composite viewer profile 129 within a multidimensional vector space representing the available content space 139, and determine the content recommendation space 149 as a region of the multidimensional vector space proximate to the location of the composite viewer profile 129. Other embodiments use probabilistic matrix factorization and/or other techniques to compute the content recommendation space 149 as a function of the composite viewer profile 129 and the available content space 139.

Embodiments of the MRCC system 115 include a display interface engine 150 to direct output, by the display device 160, of a recommendation interface (e.g., a user interface) indicating at least a portion of the recommended content options. The recommendation interface can be output in a manner that facilitates selection of any of the indicated recommended content options by one of the individual viewers 105 (e.g., using an input device 162). Some implementations of the recommendation interface indicate the recommended content options as a grid of thumbnails, or the like, each representing a corresponding one of the recommended content options. Other implementations of the recommendation interface indicate the recommended content options as an alphanumeric list of recommended content options (e.g., including titles and/or other information). Other implementations automatically select one of the recommended content options for playback. Other implementations automatically select multiple of the recommended content options for contemporaneous playback via a multi-view or other mode of the display device 160. For example, if the content recommendation space 149 includes a number of sports games, multiple of the sports games can be played in corresponding regions of the display device 160 (e.g., the screen is split into four regions, each showing a different one of four sports games). Other implementations of the recommendation interface include interface controls to facilitate other types of interactions, such as sorting or filtering the listing of recommended content options, adding recommended content options to an initially displayed subset, etc. In some embodiments, the recommendation interface indicates the recommended content options in a manner similar to that of an electronic programming guide (EPG). In some such embodiments, the recommendation interface is a dedicated EPG that includes only the listing of recommended content options. In other such embodiments, the recommendation interface modifies an existing EPG (e.g., the standard EPG used for navigating the available content space 139 via the display device 160). Within the listing of available programming content options, graphical techniques can be used to draw attention to the recommended content options and/or to draw attention away from non-recommended programming content options. For example, recommended content options can be highlighted or framed with a particular color, recommended content options can be listed using a particular font or size, recommended content options can be listed along with additional indicators (e.g., a star, an icon, a thumbnail, etc.), non-recommended content options can be blanked or shaded, etc.

Figure 2A:
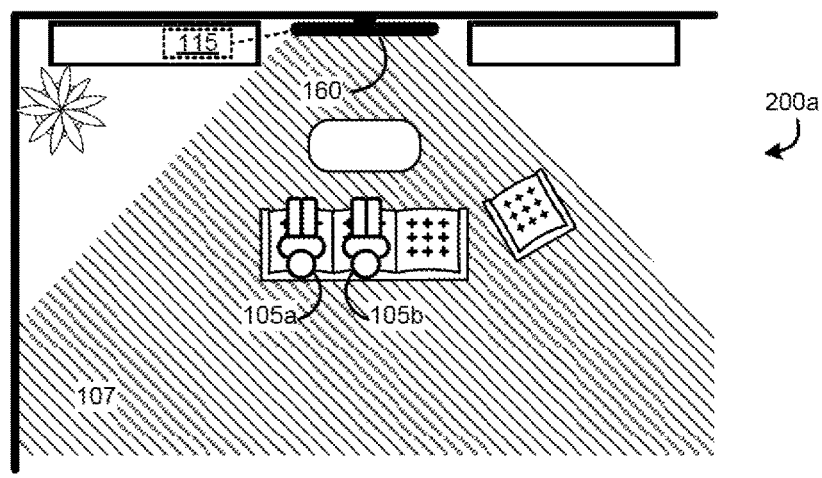
FIGS. 2A-2C show illustrative depictions of a living room in a viewer premises, in which a display device is arranged for shared media consumption by individual viewers.
Figure 2B:
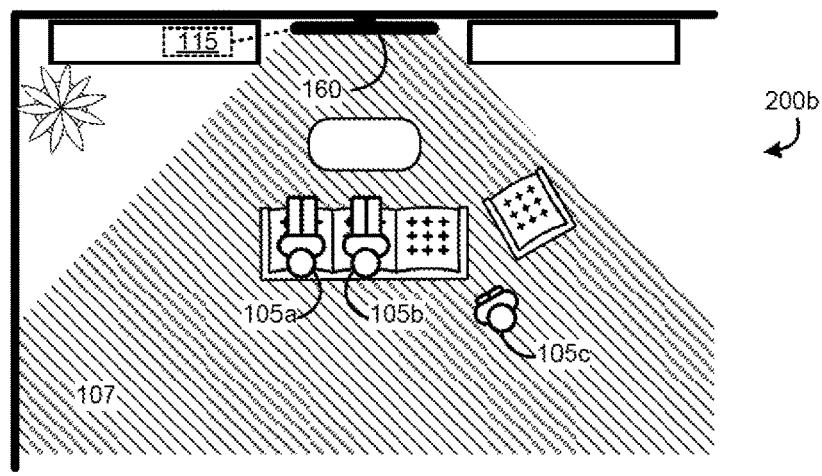
Figure 2C:
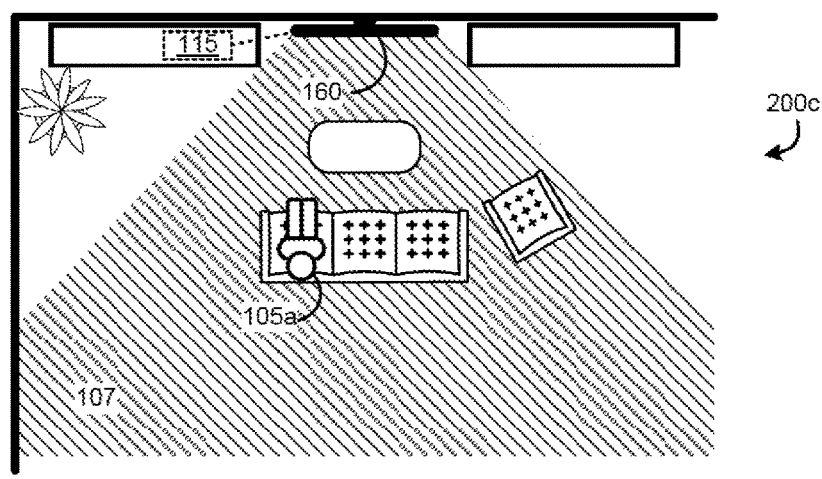

FIGS. 2A-2C show illustrative depictions of a living room in a viewer premises 200, in which a display device 160 is arranged for shared media consumption by individual viewers 105. As illustrated, the display device 160 is in communication with a MRCC system 115. Turning first to FIG. 2A, the viewer premises 200a is illustrated as having two individual viewers 105 sitting on a couch, within a predefined viewing region 107 of the display device 160, engaging in a shared media consumption experience. The predefined viewing region 107 is illustrated as consuming For example, the two individual viewers 105 would like to watch a movie together. In some embodiments, the MRCC system 115 directs output of recommendations and recommended content options, as described above with reference to FIG. 1. For example, the MRCC system 115 receives a request for a programming recommendation from a first individual viewer 105a of the group (e.g., via a remote control). In response to the request, the MRCC system 115 can perform the various functions relating to computing the content recommendation space 149, such as detecting the first and second individual viewers 105 as the group of viewers, obtaining respective individual viewer profiles 126, generating a composite viewer profile 129 from the individual viewer profiles 126, obtaining an available content space 139, and computing the content recommendation space 149. Also, in response to the request, the MRCC system 115 can direct output of the recommendation interface.

Having output the recommendation interface for display via the display device 160, embodiments can handle interactions between the individual viewers 105 and the recommendation interface. In one implementation, the MRCC system 115 can detect an interaction between the first individual viewer 105a (e.g., via the remote control) and the recommendation interface indicating a selection of one of the recommended content options displayed on the recommendation interface. In response to the interaction, the MRCC system 115 (e.g., the content engine 130) can obtain the selected recommended content option, and can direct playback, via the display device 160, of the selected recommended content option.

Some embodiments of the MRCC system 115 can also dynamically handle changes in the composition of the group of individual viewers 105 during playback of a programming content option via the display device 160. The programming content option that is currently being played back via the display device 160 may be one of the recommended content options from the content recommendation space 149 (e.g., selected via the recommendation interface), or may be any of the other programming content options. It can be assumed that the programming content option currently being shown on the display device 160 is appropriate to be shown to the group of individual viewers 105 currently watching the programming content option (e.g., the programming content option was recommended for that group, etc.). In such embodiments, during playback of a programming content option, the MRCC system 115 can detect a change in composition of the plurality of individual viewers. One such scenario is illustrated by FIG. 2B, in which a new individual viewer 105 (i.e., not previously part of the group) enters the predefined viewing region 107 of the display device 160. Another such scenario is illustrated by FIG. 2C, in which one of the group members (i.e., either of individual viewer 105a or 105b, who was previously part of the group) leaves the predefined viewing region 107 of the display device 160.

In either type of scenario, embodiments of the MRCC system 115 can generate a revised composite viewer profile responsive to the change in the composition of the individual viewers 105. As described above, it is previously assumed that the currently playing programming content option was appropriate for the group composition prior to the change; and it can be desirable to determine whether the currently playing programming content option continues to be appropriate for the new group composition (i.e., there may or may not be a meaningful change in the composite viewer profile 129). For example, if individual viewers 105a and 105b have similar enough individual viewer profiles 126, their composite viewer profile 129 may be similar enough to each of their individual viewer profiles 126; such that the departure of individual viewer 105b in FIG. 2C may not meaningfully change the composition of the viewer group. Similarly, if individual viewer 105c is similar enough to individual viewers 105a and 105b, entry of individual viewer 105c in FIG. 2B may not meaningfully change the composition of the viewer group.

Embodiments of the MRCC system 115 can determine a conflict resulting from the revised composite viewer profile. In some embodiments the conflict can be between the content recommendation space 1459 (i.e., the space that led to recommendation of the currently playing programming content option) and the revised composite viewer profile. In other embodiments, the conflict is between metadata (or other suitable descriptive information) of the currently playing programming content option and the revised composite viewer profile. Regardless of the type of mismatch, embodiments of the MRCC system 115 can direct adaptation of the playback of the currently playing programming content option in accordance with the conflict. As one example, a group of adults (individual viewers 105a and 105b) is watching a movie with explicit content, and a young child (individual viewer 105c) walks into the room. The MRCC system 115 can automatically detect that entry of the child has changed the composite viewer profile 129, such that there is a mismatch. In response, playback can be adapted (e.g., immediately) in any suitable manner, for example, by pausing playback, muting playback, and/or blanking the screen. As another example, an adult and child (individual viewers 105a and 105b) are watching a movie edited to remove explicit content (e.g., by playing an edited version of the movie, or by using a filtering application that dynamically edits in real time to remove explicit content). When the child leaves the room, the MRCC system 115 can automatically detect that the composite viewer profile 129 has changed, such that there is a mismatch. In response, playback can be adapted (e.g., immediately) to permit explicit content, for example, by switching over to an unedited version of the movie, by disabling the filtering application, etc.

Figure 3:
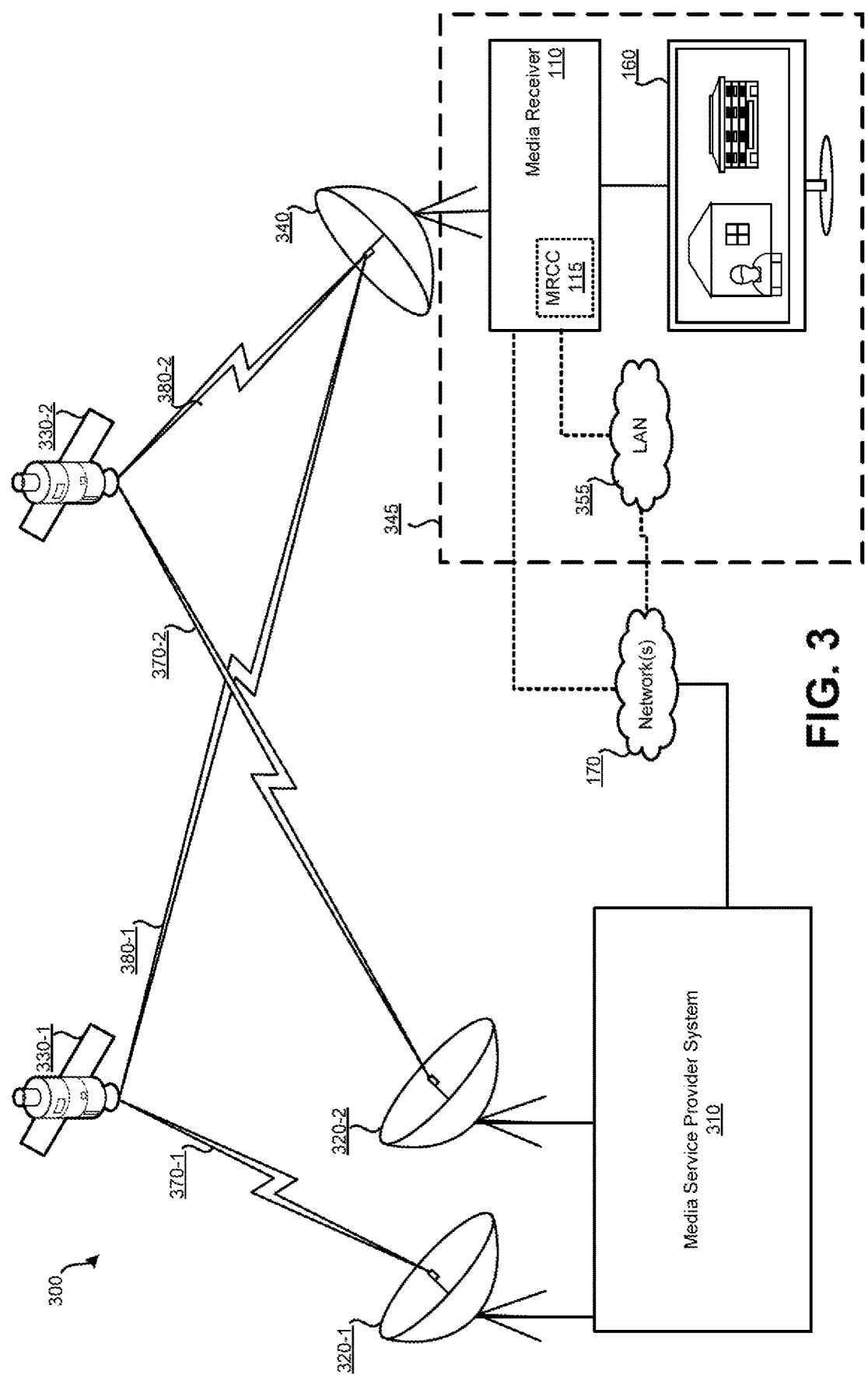
FIG. 3 shows an illustrative satellite television distribution system as an example context for various embodiments described herein.

The MRCC system 115 and the media consumption environment 100 can be implemented in context of any suitable communications system. FIG. 3 shows an illustrative satellite television distribution system 300 as an example context for various embodiments described herein. Satellite television distribution system 300 may include: television service provider system 310, satellite transmitter equipment 320, satellites 330, satellite dish 340, media receiver 110, and display device 160. Alternate embodiments of satellite television distribution system 300 may include fewer or greater numbers of components. While only one satellite dish 340, media receiver 110, a MRCC system 115 (e.g., as a separate appliance, integrated in the media receiver 110, etc.) and display device 160 (collectively referred to as "user equipment") are illustrated, it should be understood that multiple (e.g., tens, thousands, millions) instances of user equipment may receive television signals from television service provider system 310 via satellites 330. Further, while embodiments are described in particular context of a satellite television distribution system 300, techniques described herein can also be implemented in context of other television and media distribution architectures and infrastructures, such as cable television distribution networks.

The user equipment is shown disposed at a subscriber premises 345. The subscriber premises 345 can be a subscriber's home, office, or any suitable location associated with a particular subscriber at which to locate the subscriber's satellite dish 340 and media receiver 110. As one example, the satellite dish 340 is mounted to an exterior location (e.g., wall, roof, etc.) of the subscriber's home, and cables run from the satellite dish 340 to the media receiver 110, which is located inside the subscriber's home; and one or more display devices 160 (e.g., televisions) is coupled with the media receiver 110 and located in the subscriber's home.

Other user equipment can be in the subscriber's premises 345 that may or may not be directly associated with the television service provider. As illustrated, the user equipment can include a LAN router 355 in communication with the network 170. The LAN router 355 can be implemented as any suitable device or set of devices that creates a local network from the network 170 connection. For example, the LAN router 355 can include any suitable routers, switches, modems, wireless transceivers, wired ports, etc. Though described as a "LAN," the LAN router 355 can create any suitable type of network, such as a wide-area network (WAN), a home-area network (HAN), a wireless local-area network (WLAN), etc. The LAN router 355 can be in communication with the media receiver 110 using a wired or wireless communications link. This can enable certain functions described herein, such as automatic discovery of presently unpaired devices.

The LAN router 355 can also provide local connectivity with one or more additional subscriber devices. Some such subscriber devices can be portable subscriber devices that may or may not remain in the subscriber's premises 345, such as the illustrated smart phone or laptop computer. As described herein, certain of those portable subscriber devices may be configurable as remote media playback devices using specialized coordination applications. For example, a subscriber may desire to use one or more of the portable subscriber devices to playback one or more of: live television programming received via the media receiver 110 (e.g., linearly broadcast television programming), on-demand television programming receivable via the media receiver 110, on-demand television programming locally cached by the media receiver 110, other recorded media locally cached by the media receiver 110, subscription media available via the Internet or other content distribution channels, etc.

Television service provider system 310 and satellite transmitter equipment 320 may be operated by a television service provider. A television service provider may distribute television channels, on-demand programming, programming information, and/or other content/services to users. Television service provider system 310 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites. Each satellite may relay multiple transponder streams. Satellite transmitter equipment 320 (120-1, 320-2) may be used to transmit a feed of one or more television channels from television service provider system 310 to one or more satellites 330. While a single television service provider system 310 and satellite transmitter equipment 320 are illustrated as part of satellite television distribution system 300, it should be understood that multiple instances of transmitter equipment may be used, possibly scattered geographically, to communicate with satellites 330. Such multiple instances of satellite transmitting equipment 320 may communicate with the same or with different satellites 330. Different television channels may be transmitted to satellites 330 from different instances of transmitting equipment 320. For instance, a different satellite dish of satellite transmitter equipment 320 may be used for communication with satellites 330 in different orbital slots.

Satellites 330 may be configured to receive signals, such as streams of television channels, from one or more satellite uplinks such as satellite transmitter equipment 320. Satellites 330 may relay received signals from satellite transmitter equipment 320 (and/or other satellite transmitter equipment) to multiple instances of user equipment via transponder streams. Different frequencies may be used for uplink signals 370 from transponder streams 380. Satellites 330 may be in geosynchronous orbit. Each of the transponder streams transmitted by satellites 330 may contain multiple television channels transmitted as packetized data. For example, a single transponder stream may be a serial digital packet stream containing multiple television channels. Therefore, packets for multiple television channels may be interspersed.

Multiple satellites 330 may be used to relay television channels from television service provider system 310 to satellite dish 340. Different television channels may be carried using different satellites 330. Different television channels may also be carried using different transponders of the same satellite 330; thus, such television channels may be transmitted at different frequencies and/or different frequency ranges. As an example, a first and second television channel may be relayed via a first transponder of satellite 330-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 340 may be a piece of user equipment that is used to receive transponder streams from one or more satellites, such as satellites 330. Satellite dish 340 may be provided to a subscriber for use on a subscription basis to receive television channels provided by the television service provider system 310, satellite transmitter equipment 320, and/or satellites 330. Satellite dish 340, which may include one or more low noise blocks (LNBs), may be configured to receive transponder streams from multiple satellites and/or multiple transponders of the same satellite. Satellite dish 340 may be configured to receive television channels via transponder streams on multiple frequencies. Based on the characteristics of media receiver 110 and/or satellite dish 340, it may only be possible to capture transponder streams from a limited number of transponders concurrently. For example, a tuner of media receiver 110 may only be able to tune to a single transponder stream from a transponder of a single satellite at a given time. The tuner can then be re-tuned to another transponder of the same or a different satellite. A media receiver 110 having multiple tuners may allow for multiple transponder streams to be received at the same time.

In communication with satellite dish 340 may be one or more media receivers. Media receivers may be configured to decode signals received from satellites 330 via satellite dish 340 for output and presentation via a display device, such as display device 160. A media receiver may be incorporated as part of a television or may be part of a separate device, commonly referred to as a set-top box (STB). Media receiver 110 may decode signals received via satellite dish 340 and provide an output to display device 160. A media receiver 110 is defined to include set-top boxes (STBs) and also circuitry having similar functionality that may be incorporated with another device. For instance, circuitry similar to that of a media receiver 110 may be incorporated as part of a television, and/or such circuitry can be implemented in multiple appliances. While FIG. 3 illustrates an embodiment of media receiver 110 as separate from display device 160, it should be understood that, in other embodiments, similar functions may be performed by a media receiver integrated with display device 160.

Display device 160 may be used to present video and/or audio decoded and output by media receiver 110. Media receiver 110 may also output a display of one or more interfaces to display device 160, such as a recommendation interface and/or an electronic programming guide (EPG). In many embodiments, display device 160 is a television. Display device 160 may also be a monitor, computer, or some other device configured to display video and, possibly, play audio.

Uplink signal 370-1 represents a signal between satellite transmitter equipment 320 and satellite 330-1. Uplink signal 370-2 represents a signal between satellite transmitter equipment 320 and satellite 330-2. Each of uplink signals 370 may contain streams of one or more different television channels. For example, uplink signal 370-1 may contain a first group of television channels, while uplink signal 370-2 contains a second group of television channels. Each of these television channels may be scrambled such that unauthorized persons are prevented from accessing the television channels.

Transponder stream 380-1 represents a transponder stream signal between satellite 330-1 and satellite dish 340. Transponder stream 380-2 represents a transponder stream signal between satellite 330-2 and satellite dish 340. Each of transponder streams 380 may contain one or more different television channels, which may be at least partially scrambled. For example, transponder stream 380-1 may be a first transponder stream containing a first group of television channels, while transponder stream 380-2 may be a second transponder stream containing a different group of television channels. When a television channel is received as part of a transponder stream and is decoded and output to display device 160 (rather than first storing the television channel to a storage medium as part of DVR functionality then later outputting the television channel from the storage medium), the television channel may be considered to be viewed "live."

FIG. 3 illustrates transponder stream 380-1 and transponder stream 380-2 being received by satellite dish 340 and distributed to media receiver 110. For a first group of television channels, satellite dish 340 may receive transponder stream 380-1 and for a second group of channels, transponder stream 380-2 may be received. Media receiver 110 may decode the received transponder streams. As such, depending on which television channels are desired to be presented or stored, various transponder streams from various satellites may be received, descrambled, and decoded by media receiver 110.

Network 170 may serve as a secondary communication channel between television service provider system 310 and media receiver 110. However, in many instances, media receiver 110 may be disconnected from network 170 (for reasons such as because media receiver 110 is not configured to connect to network 170 or a subscriber does not desire or cannot connect to network 170). As such, the connection between network 170 and media receiver 110 is represented by a dotted line. Via such a secondary communication channel, bidirectional exchange of data may occur. As such, data may be transmitted to television service provider system 310 from media receiver 110 via network 170. Data may also be transmitted from television service provider system 310 to media receiver 110 via network 170. Network 170 may be the Internet. While audio and video services may be provided to media receiver 110 via satellites 330, feedback from media receiver 110 to television service provider system 310 may be transmitted via network 170.

Figure 4:
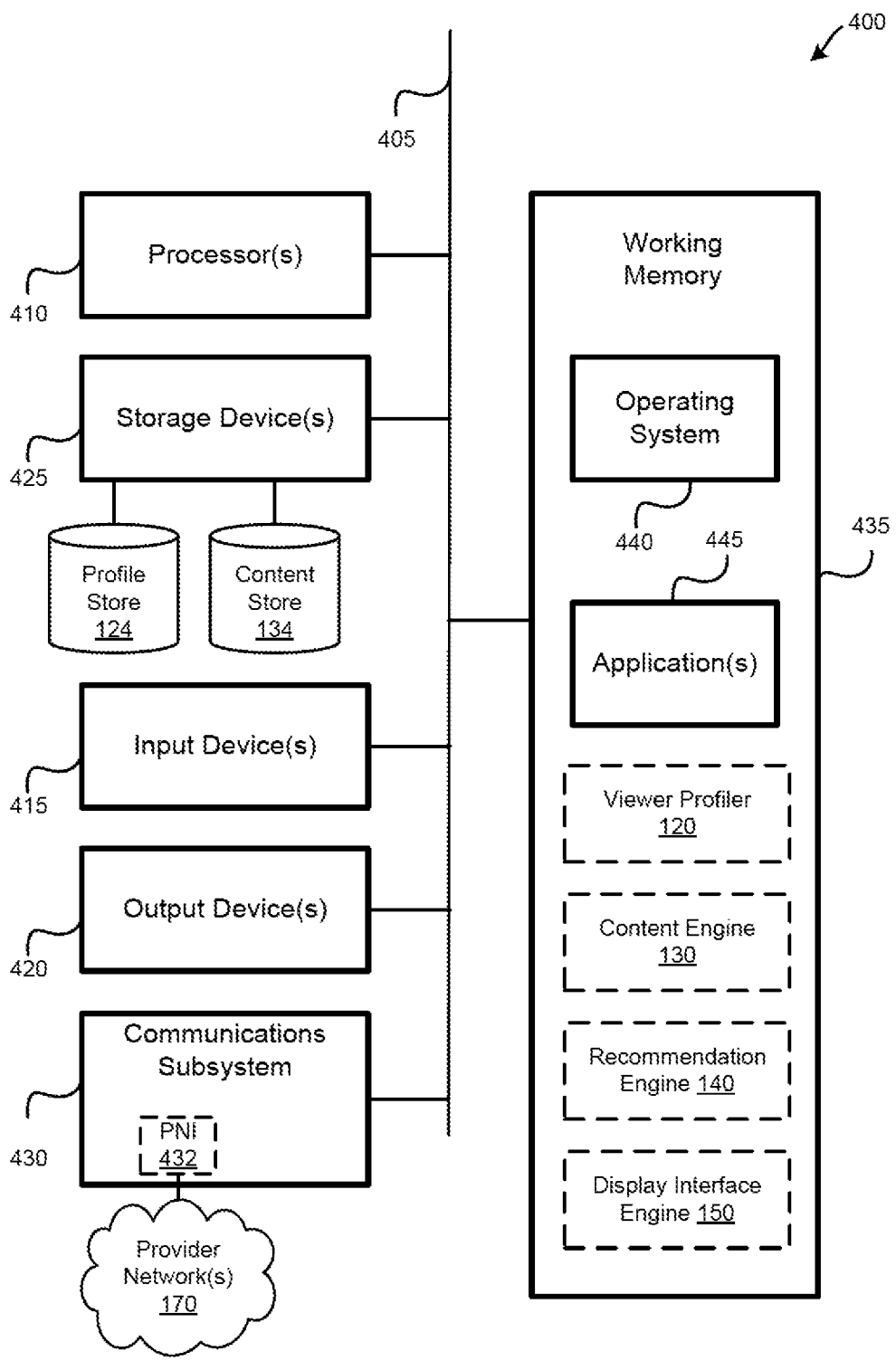
FIG. 4 provides a schematic illustration of one embodiment of a computer system that can perform various steps of the methods provided by various embodiments.

A computer system as illustrated in FIG. 4 may be incorporated as part of the previously described computerized devices, such as the MRCC system 115. FIG. 4 provides a schematic illustration of one embodiment of a computer system 400 that can perform various steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like.

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the non-transitory storage devices 425 include the content store 134 and/or the profile store 124.

The computer system 400 might also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. The communications subsystem 430 may permit data to be exchanged with a network (such as the media provider networks 170, to name one example), personal electronic devices 164, input devices 162, other computer systems, and/or any other devices described herein. In many embodiments, the computer system 400 will further comprise a working memory 435, which can include a RAM or ROM device, as described above.

The computer system 400 also can comprise software elements, shown as currently being located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code. In some embodiments, the executable code, when executed, implements one or more of the viewer profiler 120, the content engine 130, the recommendation engine 140, and the display interface engine 150.

In some embodiments, the computer system 400 implement the MRCC system 115 (e.g., as part of a media receiver 110) in communication with a display device 160. The MRCC system 115 includes a provider network interface 432 (as part of the communications subsystem 430 to communicatively couple with one or more content provider networks 170. The MRCC system 115 also includes one or more of the processors 410, and a memory (e.g., working memory 435) communicatively coupled with, and readable by, the one or more processors 410 and having stored therein processor-readable instructions. When the instructions are executed by the one or more processors 410, they can cause the one or more processors 410 to: detect individual viewers as within a predefined viewing region of the display device 160; obtain a respective individual viewer profile corresponding to each of the individual viewers; dynamically generate a composite viewer profile for the individual viewers as a composite of the respective individual viewer profiles; obtain an available content space indicating programming content options available for output to the display device 160 at least via the provider network interface 432; compute a content recommendation space as a function of the composite viewer profile and the available content space, such that the content recommendation space defines recommended content options as a subset of the programming content options determined to be recommended in accordance with the composite viewer profile; and direct output, by the display device 160, of a user interface indicating at least a portion of the recommended content options.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
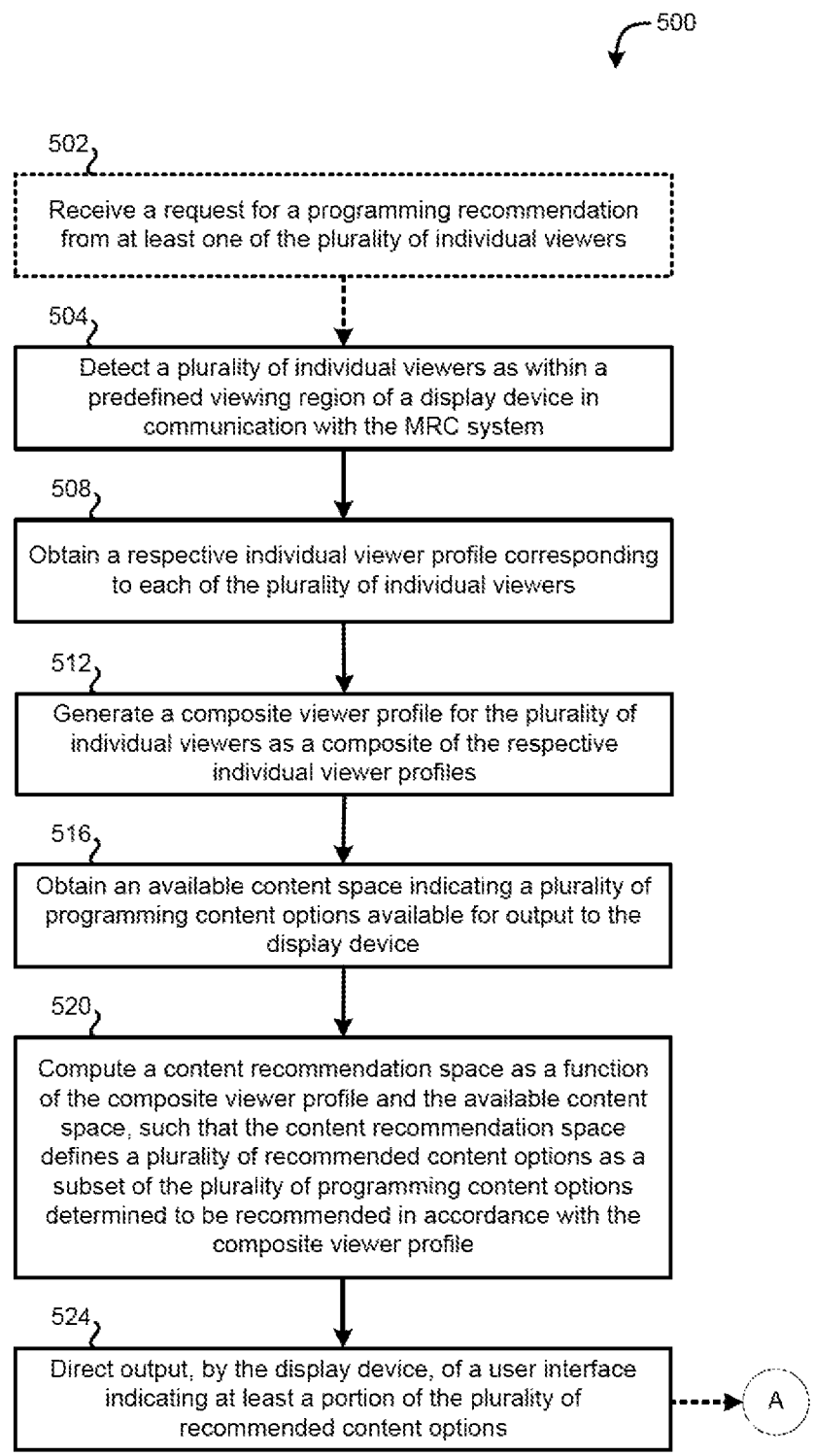
FIG. 5 shows a flow diagram of an illustrative method for viewer compositing in a media recommendation and consumption compositor (MRCC) system, according to various embodiments.

Systems including those described above can be used to implement various methods. FIG. 5 shows a flow diagram of an illustrative method 500 for viewer compositing in a media recommendation and consumption compositor (MRCC) system, according to various embodiments. Embodiments of the method 500 begin at stage 504 by detecting individual viewers as within a predefined viewing region of a display device in communication with the MRCC system. For example, the detecting can include receiving an input signal from at least one of an input device associated with the media receiver and/or the display device, or a mobile personal electronic device of one of the individual viewers. In such a scenario, the input signal can include identification data for at least one of the plurality of individual viewers.

At stage 508, embodiments obtain a respective individual viewer profile corresponding to each of the individual viewers. In embodiments that receive an input signal from an input device and/or personal electronic device (as described above), the obtaining at stage 508 can include at least one of: generating the at least one of the respective individual viewer profiles directly from the identification data; retrieving the at least one of the respective individual viewer profiles from a local profile store of the MRCC system in accordance with the identification data; or retrieving the at least one of the respective individual viewer profiles from a remote profile store via a communication network in accordance with the identification data.

At stage 512, embodiment generate a composite viewer profile for the plurality of individual viewers as a composite of the respective individual viewer profiles. At stage 516, embodiments obtain an available content space indicating programming content options available for output to the display device. For example, the available content space can include content received over a provider network, from a local storage device, etc. At stage 520, embodiments compute a content recommendation space as a function of the composite viewer profile and the available content space. The computed content recommendation space defines a plurality of recommended content options as a subset of the programming content options determined to be recommended in accordance with the composite viewer profile. At stage 524, embodiments direct output, by the display device, of a recommendation interface indicating at least a portion of the plurality of recommended content options.

In some embodiments, the method 500 begins at stage 502 by receiving a request for a programming recommendation from at least one of the individual viewers. In such embodiments, some or all of stages 504-524 can be performed responsive to the request received in stage 502. For example, the computing at stage 520 and the directing at stage 524 are responsive to receiving the request for the programming recommendation at stage 502.

Figure 6:
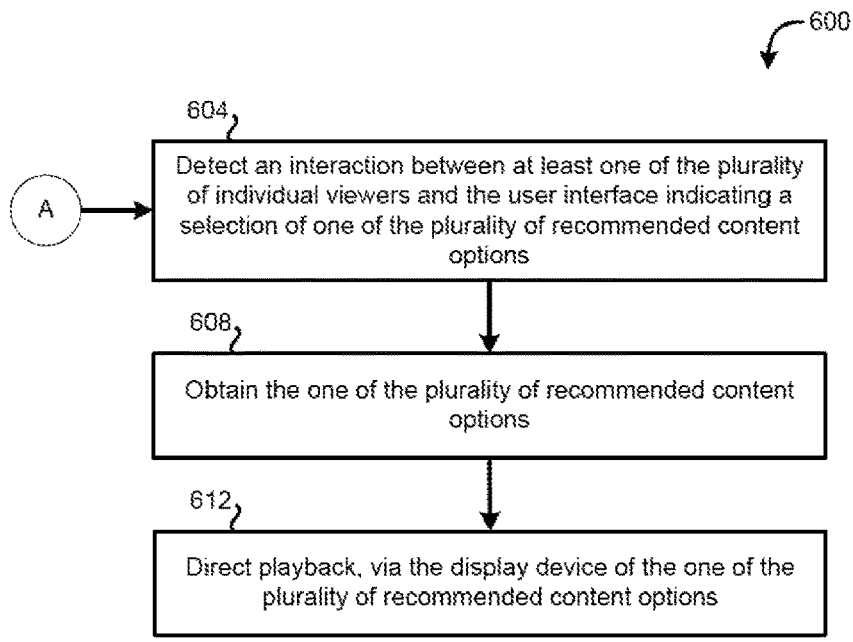
FIG. 6 shows a flow diagram of an illustrative method for interaction with a recommendation interface generated by a MRCC system, according to various embodiments.

FIG. 6 shows a flow diagram of an illustrative method 600 for interaction with a recommendation interface generated by a media recommendation and consumption compositor (MRCC) system, according to various embodiments. As indicated by reference "A" shown on both FIG. 5 and FIG. 6, the method 600 of FIG. 6 can be a continuation of the method 500 of FIG. 5 in some implementations. Embodiments of the method 600 begin at stage 604 by detecting an interaction between at least one of the individual viewers and the recommendation interface indicating a selection of one of the recommended content options. At stage 608, embodiments can obtain the selected one of the recommended content options. At stage 612, embodiments can direct playback, via the display device, of the selected one of the recommended content options.

Figure 7:
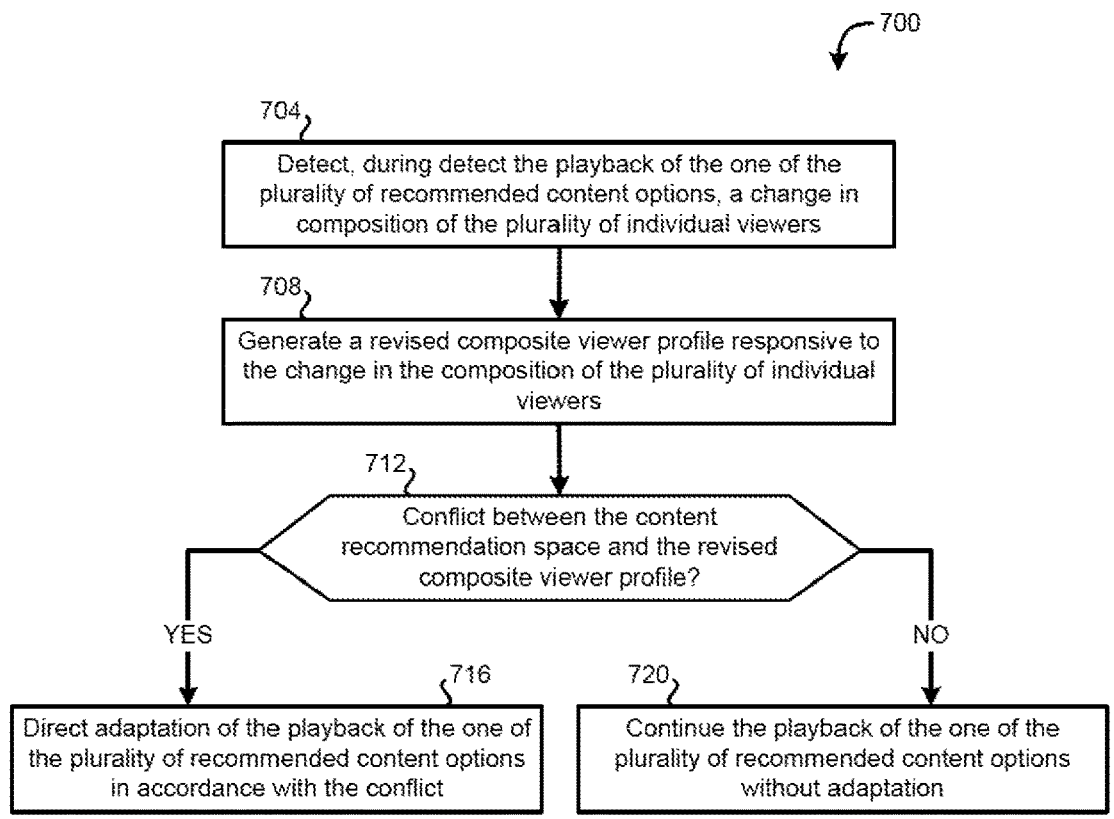
FIG. 7 shows a flow diagram of an illustrative method for dynamic response to a change in viewer profile composition, according to various embodiments.

FIG. 7 shows a flow diagram of an illustrative method 700 for dynamic response to a change in viewer profile composition, according to various embodiments. The method 700 assumes that a programming content option is currently being played on a display device. In some embodiments, the method 700 of FIG. 7 is a continuation of the method 600 of FIG. 6, such that the currently playing content in FIG. 7 is the selected recommended content option from FIG. 6. Embodiments of the method 700 begin at stage 704 by detecting, during playback of the presently playing programming content option (e.g., of the selected one of the recommended content options), a change in composition of the group of individual viewers. At stage 708, embodiments can generate a revised composite viewer profile responsive to the change in the composition of the individual viewers.

At stage 712, a determination can be made as to whether there is a conflict between the presently playing content (e.g., the content recommendation space) and the revised composite viewer profile. At stage 716, in response to determining a conflict exists at stage 712, embodiments can direct adaptation of the playback of the currently playing content (e.g., the selected one of the recommended content options) in accordance with the conflict. At stage 720, in response to determining that no conflict exists at stage 712, embodiments can continue playback of the currently playing content without adaptation.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A media receiver in communication with a display device, and comprising:
a provider network interface to communicatively couple with one or more content provider networks;
one or more processors; and
a memory communicatively coupled with, and readable by, the one or more processors and having stored therein processor-readable instructions which, when executed by the one or more processors, cause the one or more processors to:
detect a plurality of individual viewers as within a predefined viewing region of the display device by providing a visual and/or audible prompt requesting identification of the individual viewers, and receiving a response to the prompt from at least one of the individual viewers;
compute a content recommendation space as a function of the composite viewer profile of the plurality of individual viewers and of an available content space of programming content options available for output to the display device at least via the provider network interface, such that the content recommendation space defines a plurality of recommended content options as a subset of the plurality of programming content options determined to be recommended in accordance with the composite viewer profile;
automatically select and obtain multiple of the plurality of recommended content options for contemporaneous playback via a multi-view mode of the display device; and
direct output, by the display device, of the multi-view mode to contemporaneously playback the multiple of the plurality of recommended content options, each in a corresponding playback region on the display device.

2. The media receiver of claim 1, wherein the processor-readable instructions, when executed by the one or more processors, cause the one or more processors to detect the plurality of individual viewers as within the predefined viewing region of the display device by:
receiving an input signal from at least one of the plurality of individual viewers via an input device associated with the media receiver and/or the display device, the input signal identifying at least one of the plurality of individual viewers.

3. The media receiver of claim 1, wherein the processor-readable instructions, when executed by the one or more processors, cause the one or more processors to detect the plurality of individual viewers as within the predefined viewing region of the display device by:
receiving an input signal from a mobile personal electronic device of one of the plurality of individual viewers, the input signal comprising an identifier associated with the one of the plurality of individual viewers.

4. The media receiver of claim 1, wherein the processor-readable instructions, when executed by the one or more processors, cause the one or more processors further to:
direct output, by the display device, responsive to detecting the plurality of individual viewers, of a selection interface identifying the plurality of individual viewers and providing for adding and/or removing of one or more of the plurality of individual viewers.

5. The media receiver of claim 1, wherein:
the memory comprises a profile store; and
the processor-readable instructions, when executed by the one or more processors, cause the one or more processors to obtain at least one of the respective individual viewer profiles by retrieving the at least one of the respective individual viewer profiles from the profile store.

6. The media receiver of claim 1, wherein the processor-readable instructions, when executed by the one or more processors, cause the one or more processors to direct output, by the display device, of the user interface by:
directing the display device to output an electronic programming guide dynamically customized, responsive to computing the content recommendation space, to graphically indicate the at least the portion of the plurality of recommended content options as recommended for the plurality of individual viewers.

7. The media receiver of claim 1, wherein the processor-readable instructions, when executed by the one or more processors, cause the one or more processors further to:
receive a request for a programming recommendation from at least one of the plurality of individual viewers, wherein the processor-readable instructions, when executed by the one or more processors, cause the one or more processors to compute the content recommendation space and to direct output of the user interface responsive to receiving the request for the programming recommendation.

8. The media receiver of claim 1, wherein the processor-readable instructions, when executed by the one or more processors, cause the one or more processors further to:
detect a first interaction between at least one of the plurality of individual viewers and the multi-view mode during the contemporaneous playback to access a user interface;
direct output, by the display device, responsive to the first interaction, of a user interface indicating at least a portion of the plurality of recommended content options not being contemporaneously played back;
detect a second interaction between at least one of the plurality of individual viewers and the user interface indicating a selection of one of the plurality of recommended content options;
obtain the one of the plurality of recommended content options; and
direct playback, via the display device, of the one of the plurality of recommended content options.

9. The media receiver of claim 8, wherein the processor-readable instructions, when executed by the one or more processors, cause the one or more processors further to:
detect, during detect the playback of the one of the plurality of recommended content options, a change in composition of the plurality of individual viewers;
generate a revised composite viewer profile responsive to the change in the composition of the plurality of individual viewers;
determine a conflict between the content recommendation space and the revised composite viewer profile; and
direct adaptation of the playback of the one of the plurality of recommended content options in accordance with the conflict.

10. A method for viewer compositing in a media recommendation and consumption compositor (MRCC) system, the method comprising:
detecting, using the MRCC system, a plurality of individual viewers as within a predefined viewing region of a display device in communication with the MRCC system by providing a visual and/or audible prompt requesting identification of the individual viewers, and receiving a response to the prompt from at least one of the individual viewers;

computing, content recommendation space as a function of the composite viewer profile of the plurality of individual viewers and of an available content space of programming content options available for output to the display device at least via the provider network interface, such that the content recommendation space defines a plurality of recommended content options as a subset of the plurality of programming content options determined to be recommended in accordance with the composite viewer profile;

automatically select and obtain multiple of the plurality of recommended content options for contemporaneous playback via a multi-view mode of the display device; and directing output, by the display device, using the MRCC system, of the multi-view mode to contemporaneously playback the multiple of the plurality of recommended content options, each in a corresponding playback region on the display device.

11. The method of claim 10, further comprising:
directing output, by the display device, using the MRCC system, responsive to the detecting, of a selection interface identifying the plurality of individual viewers and providing for adding and/or removing of one or more of the plurality of individual viewers.

12. The method of claim 10, wherein:
the detecting comprises receiving an input signal from at least one of an input device associated with the media receiver and/or the display device, or a mobile personal electronic device of one of the plurality of individual viewers; and
the input signal comprises identification data for at least one of the plurality of individual viewers.

13. The method of claim 12, wherein the obtaining the at least one of the respective individual viewer profiles comprises at least one of:
generating the at least one of the respective individual viewer profiles directly from the identification data;
retrieving the at least one of the respective individual viewer profiles from a local profile store of the MRCC system in accordance with the identification data; or
retrieving the at least one of the respective individual viewer profiles from a remote profile store via a communication network in accordance with the identification data.

14. The method of claim 10, further comprising:
receiving, using the MRCC system, a request for a programming recommendation from at least one of the plurality of individual viewers,
wherein the computing the content recommendation space and the directing output of the user interface are responsive to receiving the request for the programming recommendation.

15. The method of claim 10, further comprising:
detecting, using the MRCC system during the contemporaneous playback, an interaction between at least one of the plurality of individual viewers and a user interface indicating a selection of one of the plurality of recommended content options not being concurrently played back in the multi-view mode;
obtaining, using the MRCC system, the one of the plurality of recommended content options; and directing playback, via the multi-view mode of the display device, using the MRCC system, of the one of the plurality of recommended content options.

16. The method of claim 15, further comprising:
detecting, using the MRCC system, during detect the playback of the one of the plurality of recommended content options, a change in composition of the plurality of individual viewers;
generating, using the MRCC system, a revised composite viewer profile responsive to the change in the composition of the plurality of individual viewers;
determining, using the MRCC system, a conflict between the content recommendation space and the revised composite viewer profile; and
directing adaptation, using the MRCC system, of the playback of the one of the plurality of recommended content options in accordance with the conflict.

17. A media recommendation and consumption system comprising:
a viewer profiler to detect a plurality of individual viewers as within a predefined viewing region of the display device by providing a visual and/or audible prompt requesting identification of the individual viewers, and receiving a response to the prompt from at least one of the individual viewers;
a content engine to obtain an available content space indicating a plurality of programming content options available for output to the display device;
a recommendation engine, communicatively coupled with the viewer profiler and the content engine, to compute a content recommendation space as a function of the composite viewer profile of the plurality of individual viewers and of an available content space of programming content options available for output to the display device at least via the provider network interface, such that the content recommendation space defines a plurality of recommended content options as a subset of the plurality of programming content options determined to be recommended in accordance with the composite viewer profile;
automatically select and obtain multiple of the plurality of recommended content options for contemporaneous playback via a multi-view mode of the display device; and
a display interface engine to direct output, by the display device, of the multi-view mode to contemporaneously playback the multiple of the plurality of recommended content options, each in a corresponding playback region on the display device.

18. The media recommendation and consumption system of claim 17, further comprising:
one or more sensors, in communication with the viewer profiler, to receive input signals from at least one of an input device associated with the media receiver and/or the display device, or a mobile personal electronic device of one of the plurality of individual viewers,
wherein the viewer profiler is to detect at least one of the plurality of individual viewers by identifying the at least one of the plurality of individual viewers using data received via the input signals.

19. The media recommendation and consumption system of claim 17, wherein:
the display interface engine is further to detect an interaction, during the contemporaneous playback, between at least one of the plurality of individual viewers and a user interface indicating a selection of one of the plurality of recommended content options not being concurrently played back in the multi-view mode;

the content engine is further to obtain the one of the plurality of recommended content options responsive to the interaction; and the display interface engine is further to direct playback, via the multi-view mode of the display device, of the one of the plurality of recommended content options obtained by the content engine.

20. The media recommendation and consumption system of claim 19, wherein:

the viewer profiler is further to:

detect, during detect the playback of the one of the plurality of recommended content options, a change in composition of the plurality of individual viewers;

generate a revised composite viewer profile responsive to the change in the composition of the plurality of individual viewers; and determine a conflict between the content recommendation space and the revised composite viewer profile; and display interface engine is further to direct adaptation of the playback of the one of the plurality of recommended content options in accordance with the conflict.

21. The media receiver of claim 1, wherein:

at least a first viewer of the individual viewers is associated with a stored profile;

at least a second viewer of the individual viewers is not associated with a stored profile;

the response manually identifies the first viewer by providing an identification explicitly associated with the stored profile; and the response manually identifies the second viewer by providing a categorical demographic characterization of the second viewer.

\* \* \* \* \*